Figure 1:
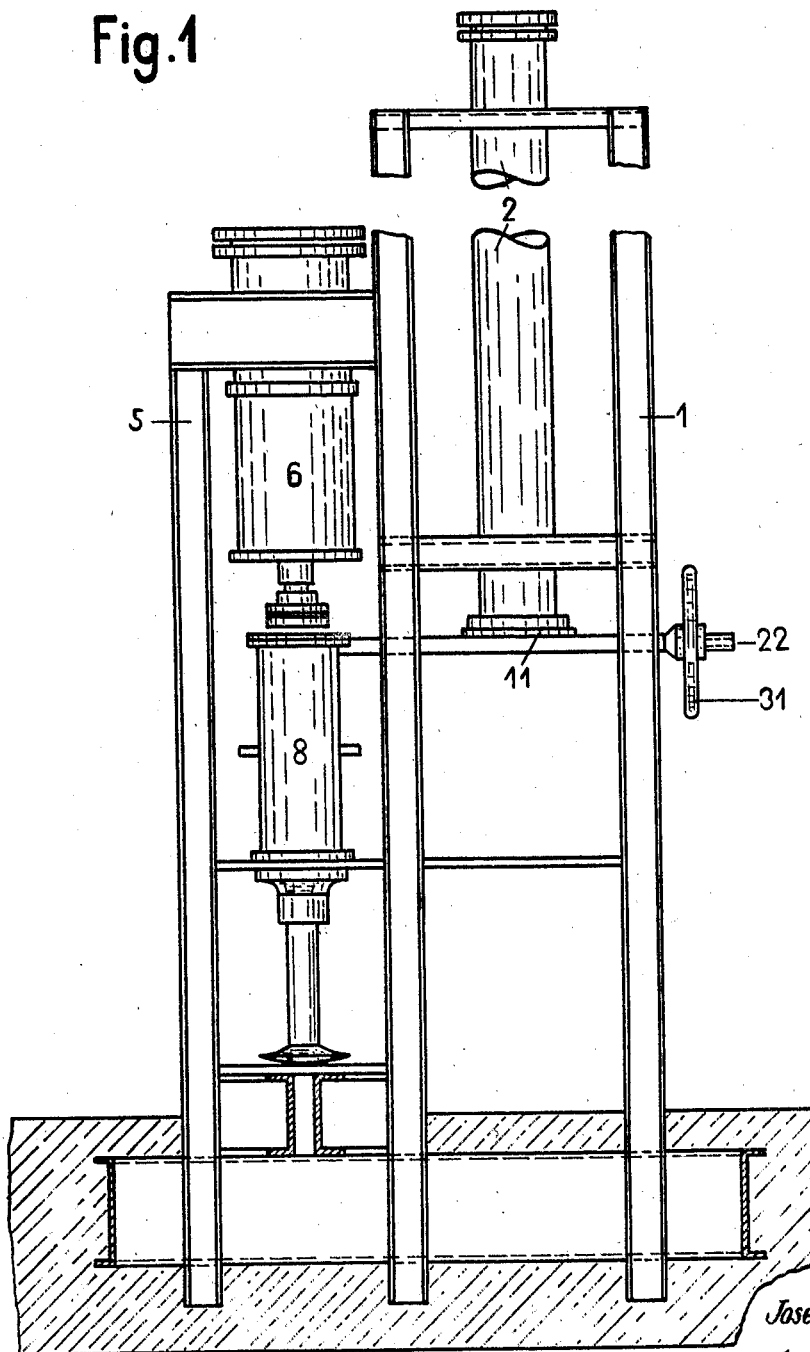

Sept. 8, 1931.   J. STOFFELS   1,822,788
PROCESS AND APPARATUS FOR PRODUCING SOLID CARBON DIOXIDE
Filed April 21, 1930   6 Sheets-Sheet 3
Fig.3
Fig 4
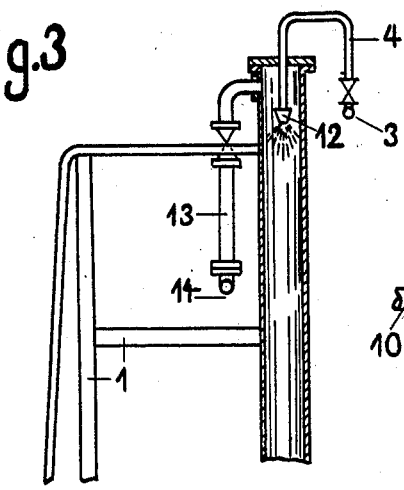
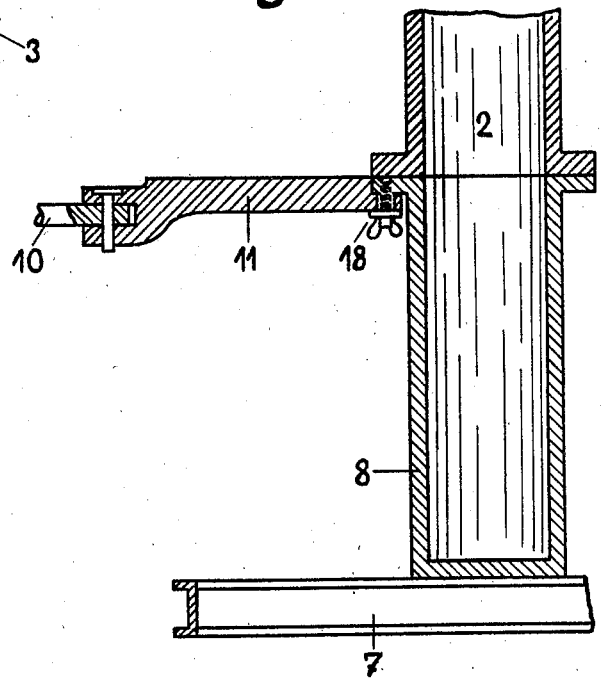
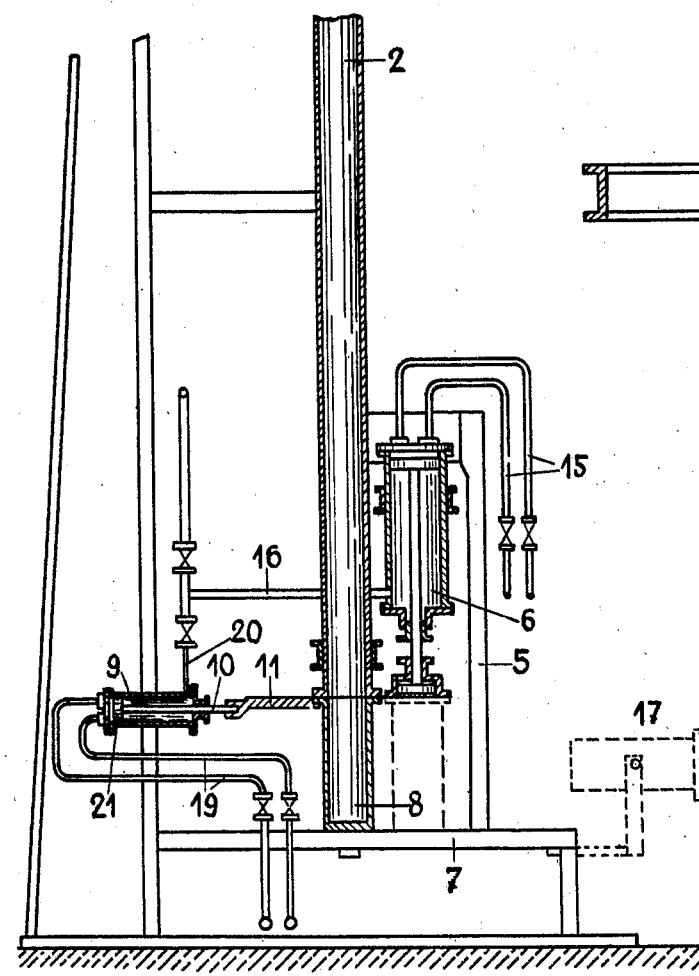
Inventor
Josef Stoffels
By Knight Bro.
Attorneys

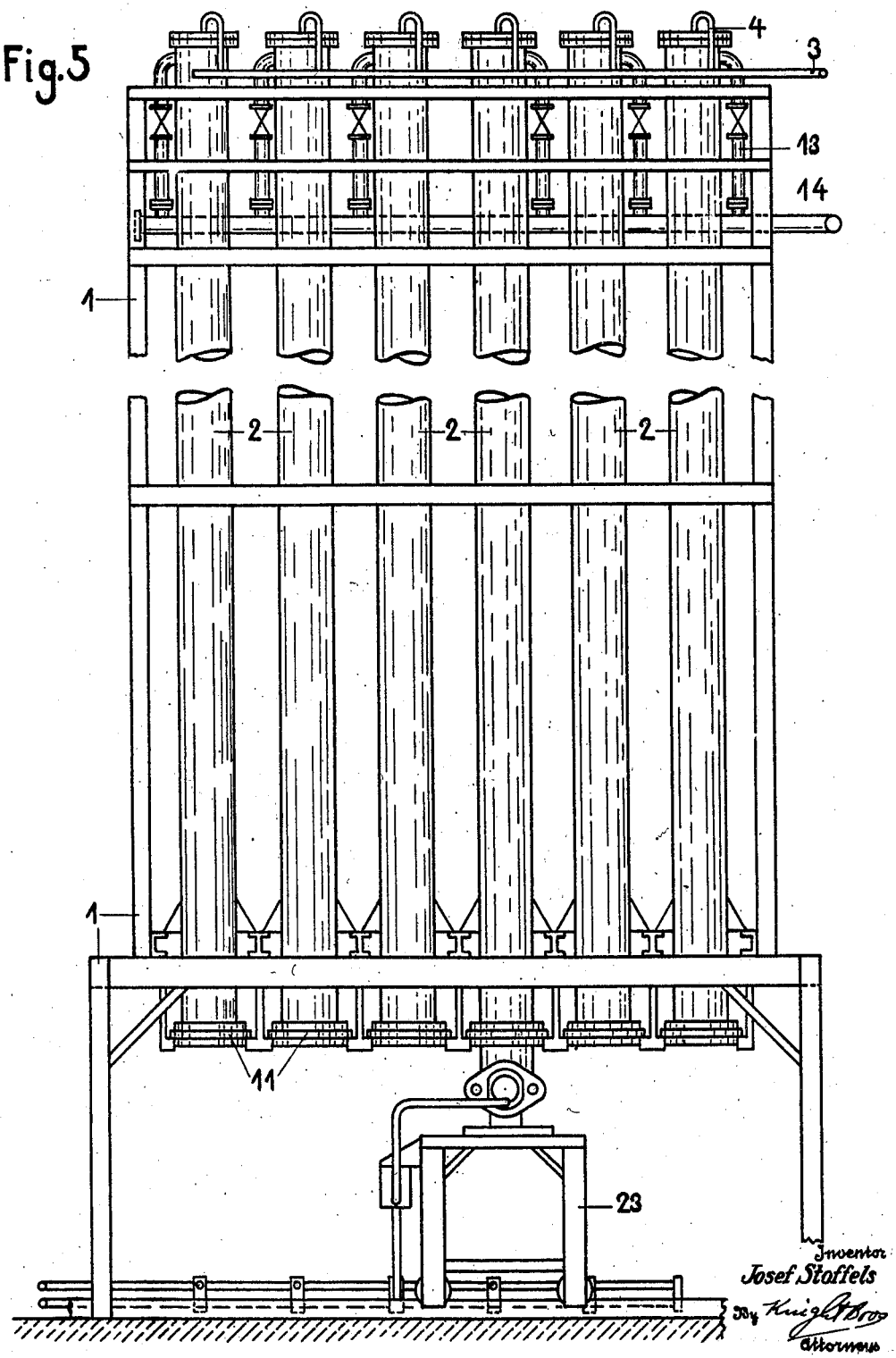

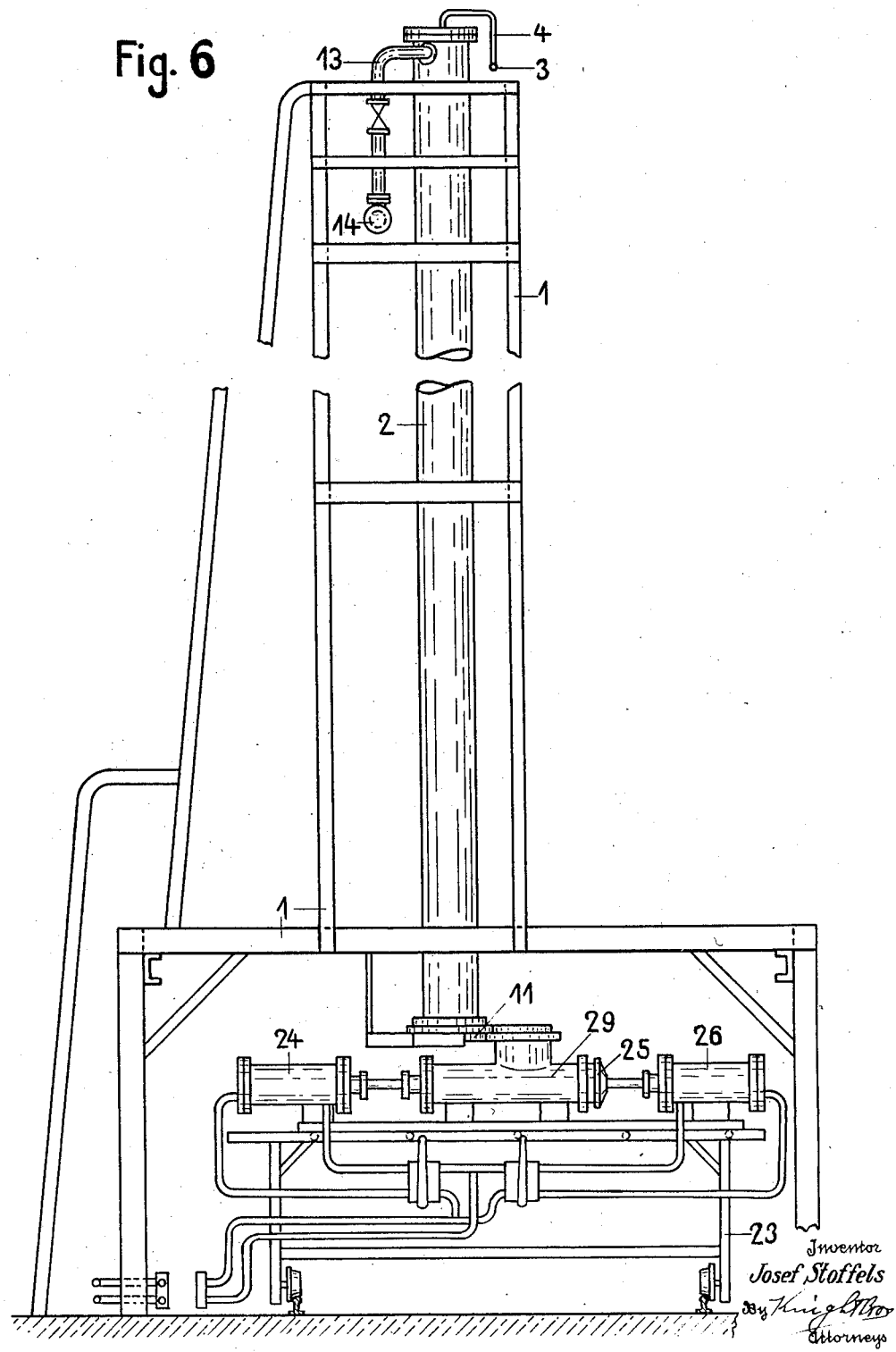

Sept. 8, 1931.  J. STOFFELS  1,822,788
PROCESS AND APPARATUS FOR PRODUCING SOLID CARBON DIOXIDE
Filed April 21, 1930  6 Sheets-Sheet 6
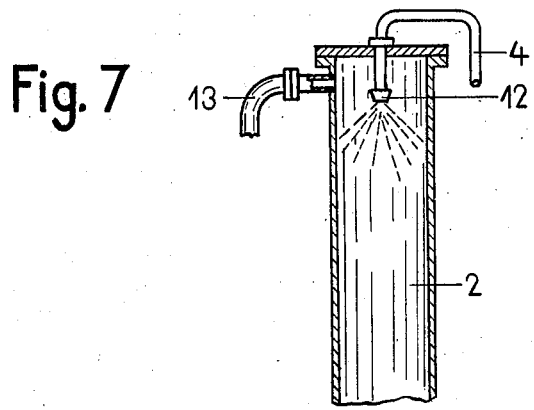
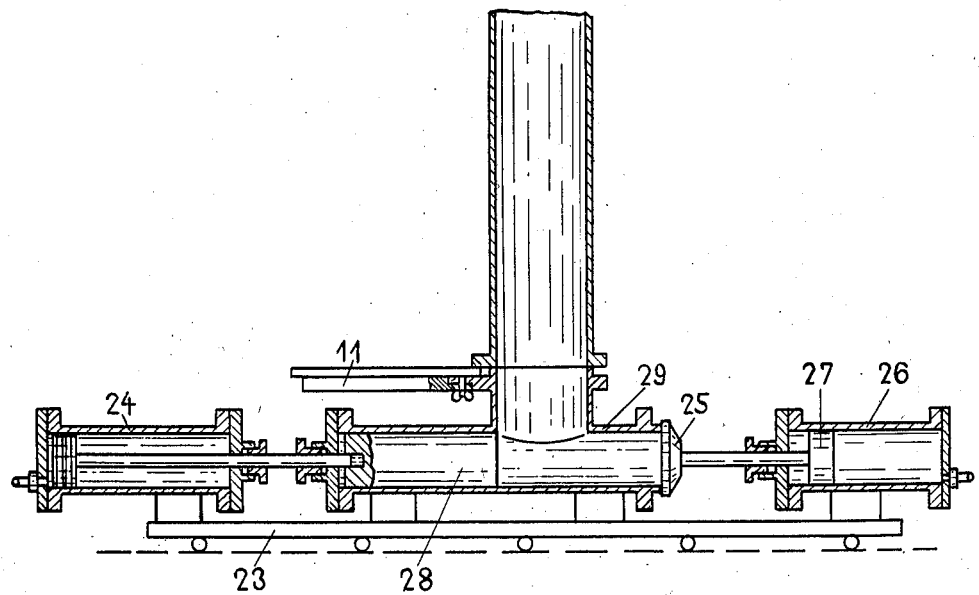
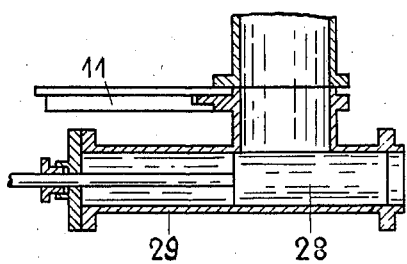
Inventor
Josef Stoffels
By Knight Bro
Attorneys Patented Sept. 8, 1931

1,822,788

UNITED STATES PATENT OFFICE

JOSEF STOFFELS, OF ESSLINGEN-ON-THE-NECKAR, GERMANY

PROCESS AND APPARATUS FOR PRODUCING SOLID CARBON-DIOXIDE

Application filed April 21, 1930, Serial No. 446,138, and in Germany April 7, 1928.

The production of carbon dioxide snow by evaporation of liquid carbon dioxide in expansion cylinders is well known. For further use the carbon dioxide snow must be brought into a more compact form by the application of pressure. The common way of doing this is by shovelling the snow out of the chamber in which it is produced and pouring it into a special press cylinder for compressing it. This process is bothersome and expensive and results in considerable loss of carbon dioxide by evaporation.

To avoid these disadvantages it has already been proposed to compress the carbon dioxide in the same cylinder in which the carbon dioxide snow is produced, or in a press cylinder which is built in with the expansion cylinder. However, there is the disadvantage in this method that every cylinder for producing the snow must be equipped with a press, so that the whole layout becomes large and costly.

According to the invention the disadvantages of both of the known processes are avoided by first transforming the liquid carbon dioxide into carbon dioxide snow in an expansion chamber, in the known manner; for compressing, this carbon dioxide snow is then discharged from the expansion chamber directly into a press cylinder brought into communication with the expansion chamber from time to time, the transfer being made without the snow coming into harmful contact with the atmosphere. The snow is then compressed in the press cylinder independent of the progress of the expansion process. In this way it is possible without anything further to use a single press cylinder for a relatively large number of snow producing chambers, since the time required for compressing a given quantity of snow is only a fraction of the time spent in producing that quantity of snow. The apparatus can therefore be constructed very simply and cheaply.

In order to prevent, as far as possible, such contact with the atmosphere as would cause evaporation of the snow, the press cylinder may be temporarily so connected with the lower covers of the snow producing chambers that it automatically takes the place of the cover as the latter is removed. As soon as the column of snow has fallen into the press cylinder, the latter is removed in the reverse direction and brought back under the press, whereby the column of snow is automatically cut off and prevented from dropping further by the lower cover of the snow producing cylinder.

The drawings show diagrammatically, by way of example, several forms of apparatus embodying the invention.

Figure 2:
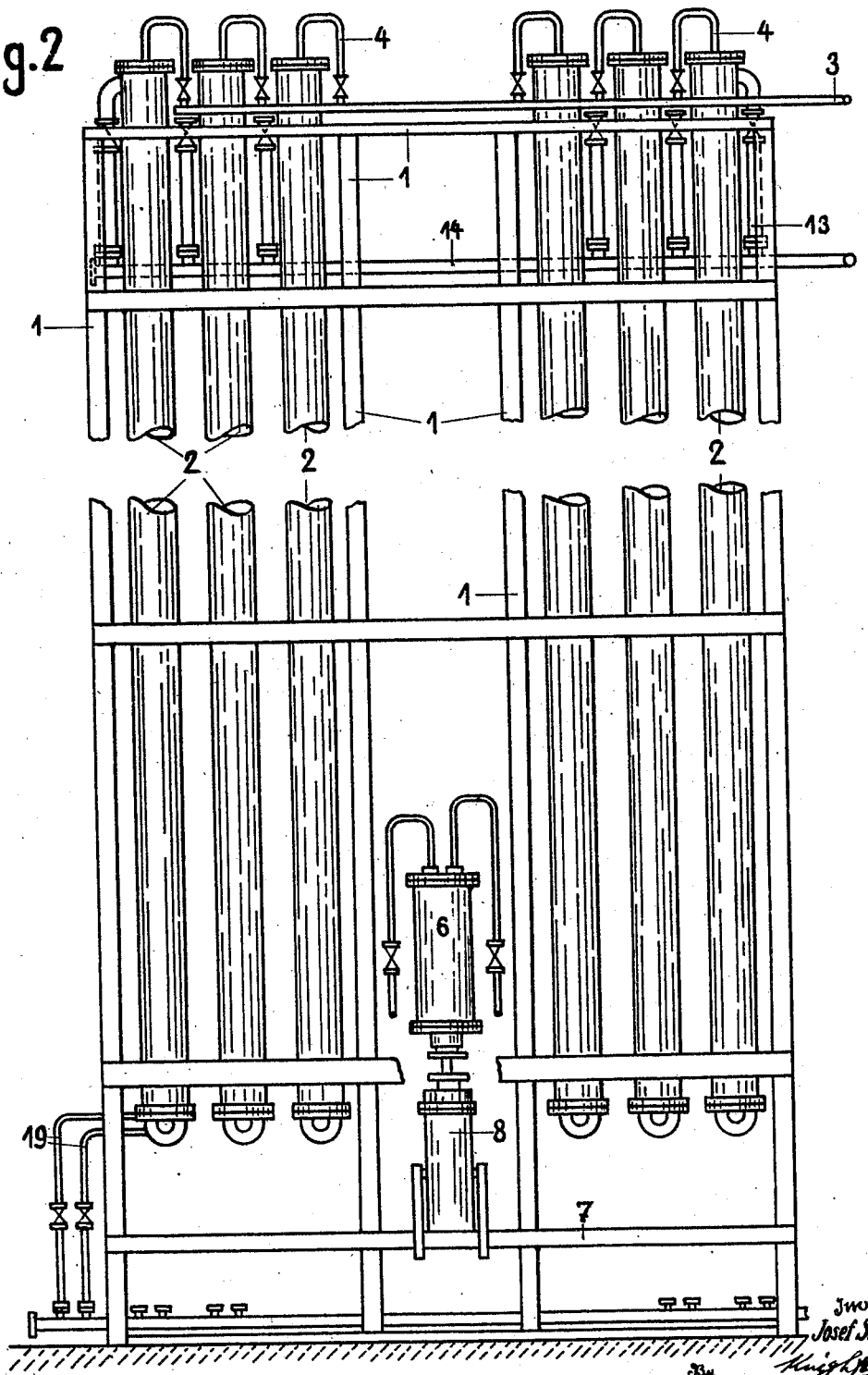

Fig. 1 shows an elevation of the simplest manually operated form,

Fig. 2 is an elevation of an apparatus with six snow producing chambers with hydraulically operated discharging device, Fig. 3 is a vertical transverse section of the apparatus shown in Fig. 2, Fig. 4 is a sectional view showing a detail, Fig. 5 is a front elevation of another form of apparatus in which the press cylinder and press for compressing the snow are mounted on a traveling carriage, Fig. 6 is a side elevation of the apparatus shown in Fig. 5, Fig. 7 is a vertical section through the compressing device on a larger scale, and Fig. 8 is a portion of the section shown in Fig. 7, with the parts in another position.

Similar parts in the various figures are indicated by the same reference characters.

The invention will first be described with reference to Figs. 2–4. On an iron scaffold 1 are mounted snow producing chambers 2, six being shown in this case. Liquid carbon dioxide is led into these chambers through a main conduit 3 and branch conduits 4 running to injection nozzles 12. In the chambers 2 the carbon dioxide leaving the nozzles is partially vaporized by expansion, whereby a large part of the carbon dioxide is cooled sufficiently to be converted into snow. The gaseous carbon dioxide developed in this way is let off through conduits 13, 14, re-condensed, and again returned to the cycle.

With the scaffold 1 is connected a supporting frame 5 for a hydraulic press 6 arranged centrally between the expansion chambers. On a platform 7 a movable press cylinder 8 can be brought under the several expansion chambers. In the position shown in Fig. 2 the press cylinder 8 is under the hydraulic press 6; in this position its contents can be compressed by the press to solid ice blocks. The operating water of the press 6 is led to and from the press by conduits 15, 16. After the compression has been completed the press cylinder 8 can be removed to the position indicated at 17 in Fig. 3 and tilted up so that it can be easily emptied.

When the cylinder 8 is to be filled with carbon dioxide snow it is moved along the platform 7 to a position in front of the snow producing cylinder from which it is to be filled. By means of a screw 18 or any other easily operated connection, the press cylinder is connected to the lower cover 11 of the expansion chamber 2. The cover is in turn connected in any suitable way to a piston rod 10 of a fluid pressure motor 9 (see Fig. 4). The operating fluid is led to and from the motor 9 by conduits 19 and 20. By movement of the piston 21 of motor 9 the cover 11 is immediately removed from the chamber 2 and simultaneously the press cylinder is brought under the expansion chamber in such a way that the carbon dioxide snow drops directly into it, without coming into contact with the outer air. When the cylinder 8 is filled with snow in this way it is removed from the expansion chamber by reversed operation of the piston 21, at the same time the column of snow is cut off by the rear edge of the press cylinder and the chamber 2 is again closed by cover 11. Thereupon the coupling 18 between cylinder 8 and cover 11 is disconnected and the press cylinder is brought under the press 6, where the snow is compressed in the manner described above.

Fig. 1 shows a somewhat simpler arrangement in which the movement of the press cylinder 8 and the lower cover 11 of the expansion cylinder 2 is manually effected by means of the hand wheel 31 and spindle 22. The connection between cover 11 and spindle 22 as well as cylinder 8 can be the same as the connections of the corresponding parts in Fig. 4.

A further development of the device as illustrated in Figs. 5 to 8 consists essentially in the arrangement of the press cylinder together with the press on a traveling carriage 23, which can be moved under the several snow producing chambers as desired. With this apparatus the compression of the snow can take place while the press cylinder is connected with the snow producing chamber, so that the whole contents of a snow producing chamber can be compressed in successive pressing operations without changing the position of the press cylinder.

As in the apparatus shown in Figs. 2–4, there are mounted on a scaffold 1 six snow producing cylinders 2, to which the liquid carbon dioxide is led by conduits 3, 4. The carbon dioxide which is not solidified is let off by conduits 13, 14. The carbon dioxide snow is compressed by a horizontally arranged press cylinder 29 mounted on the carriage 23 which can be moved upon tracks perpendicular to the axis of the snow producing chambers. The press cylinder 29 is brought under the several snow producing chambers 2 in such a way that the carbon dioxide snow is discharged into it without coming in contact with the outer air. When a snow producing chamber has been emptied, the press cylinder is removed, the lower cover 11 being automatically moved under the snow producing chamber in the manner previously described. The compression of the snow takes place while the press cylinder is connected to the snow producing chamber, a hydraulic motor 24 being used for this purpose. The cover 25 of the press cylinder 29 is held in position by a hydraulic counterpressure piston 27 in cylinder 26. At the end of each compressing process the cover 25 is removed hydraulically, while the piston in cylinder 29 supports the column of snow in chamber 2 which it cut off at the beginning of the pressing operation. Then the contents of the press cylinder 29 are pushed out by piston 28 (Fig. 8) and the press cylinder is then closed again. After that the next pressing operation can begin. After emptying one snow producing chamber the pressing device is moved under another chamber, where the same procedure is repeated.

This application is a continuation in part of my co-pending application, Serial No. 351,023, filed March 29, 1929.

Having described my invention, I claim:

1. The method of producing solid carbon dioxide, which consists in causing liquid carbon dioxide to expand into a plurality of expansion chambers, to produce carbon dioxide snow in said chambers; repeatedly filling a movable press cylinder with snow from one after another of said expansion chambers, in such a manner as to substantially prevent contact of the outer atmosphere with the snow; compressing the snow in said press cylinder each time it is filled, to form a solid block of carbon dioxide; and discharging each solid block from said press chamber after it is formed.

2. Apparatus for producing solid carbon dioxide, comprising a plurality of expansion chambers for producing carbon dioxide snow, a press cylinder, means whereby said press cylinder can be selectively put in communication with any one of said chambers to receive a charge of snow therefrom, and a press for compressing the snow in said press cylinder.

3. Apparatus for producing solid carbon dioxide, comprising a plurality of expansion chambers for producing carbon dioxide snow, a press, a press cylinder, and means whereby said press cylinder can be selectively put in communication with any one of said expansion chambers to receive a charge of snow therefrom and then returned to said press, said press being adapted to compress the snow in said press cylinder.

4. Apparatus for producing solid carbon dioxide, comprising a plurality of expansion chambers for producing carbon dioxide snow, each of said chambers having a discharge port and a cover therefor, a press cylinder, means whereby said press cylinder can be brought into and out of communication with the discharge port of any one of said chambers, means whereby the cover of said discharge port is simultaneously removed as said press cylinder is brought into communication with said discharge port and a press for compressing the snow in said press cylinder.

5. Apparatus for producing solid carbon dioxide comprising a plurality of expansion chambers for producing carbon dioxide snow, each of said chambers having a discharge port and a cover therefor, a press cylinder, means whereby said press cylinder can be brought into and out of communication with the discharge port of any one of said chambers, means whereby the cover of said discharge port is simultaneously removed as said press cylinder is brought into communication with said discharge port and restored as said press cylinder is removed from said discharge port, and a press for compressing the snow in said press cylinder.

6. Apparatus for producing solid carbon dioxide, comprising a plurality of expansion chambers for producing carbon dioxide snow, each of said chambers having a discharge port and a cover therefor, a press cylinder, a press for compressing snow in said cylinder, a carriage upon which said press cylinder and press are mounted, whereby said press cylinder can be moved under any one of said expansion chambers, means for coupling said press cylinder with the discharge port of any one of said expansion chambers, and means for effecting the simultaneous movement of said press cylinder and the cover of the discharge port with which it is being connected or disconnected.

7. Apparatus for producing solid carbon dioxide, comprising a plurality of expansion chambers for producing carbon dioxide snow, a press cylinder, a press for compressing snow in said cylinder, a carriage upon which said press and press cylinder are mounted, whereby said press cylinder can be moved under any one of said expansion chambers, and means whereby said press cylinder can be put in communication with any one of said expansion chambers to receive a charge of snow therefrom.

8. Apparatus for producing solid carbon dioxide, comprising a plurality of expansion chambers for producing carbon dioxide snow, a carriage movable under said expansion chambers, a press cylinder horizontally mounted on said carriage, said cylinder having an open end, a piston in said cylinder, a cover for closing the open end of said cylinder, motors on said carriage for moving said piston and said cover, and means for selectively connecting said press cylinder with said expansion chambers to receive charges of snow therefrom.

The foregoing specification signed at Stuttgart, Germany, this tenth day of April, 1930.

JOSEF STOFFELS.